United States Patent [19]
Wu et al.

[11] Patent Number: 5,626,828
[45] Date of Patent: May 6, 1997

[54] ZEOLITE GZS-11 AND ITS DYNAMIC PREPARATION PROCESS

[75] Inventors: Jianxin Wu, Elkridge; Robert R. Gatte, Columbia; Terry G. Roberie, Ellicott City, all of Md.

[73] Assignee: W. R. Grace & Co.-Conn., New York, N.Y.

[21] Appl. No.: 324,949

[22] Filed: Oct. 18, 1994

Related U.S. Application Data

[62] Division of Ser. No. 93,249, Jul. 16, 1993, Pat. No. 5,389,358.

[51] Int. Cl.$^6$ .................................................. C01B 39/48
[52] U.S. Cl. .......................... 423/702; 423/705; 423/709; 423/DIG. 27
[58] Field of Search .................................. 423/701, 702, 423/703, 704, 705, 706, 707, 708, 709, DIG. 27

[56] References Cited

U.S. PATENT DOCUMENTS

| Re. 28,341 | 2/1975 | Wadlinger et al. | 423/DIG. 27 |
|---|---|---|---|
| 3,433,589 | 3/1969 | Ciric et al. | 423/700 |
| 3,510,258 | 5/1970 | Hindin et al. | 423/700 |
| 3,808,326 | 4/1974 | McDaniel et al. | |
| 4,088,605 | 5/1978 | Rollmann | 423/705 |
| 4,112,056 | 9/1978 | Chen et al. | 423/704 |
| 4,203,869 | 5/1980 | Rollmann | 423/700 |
| 4,521,297 | 6/1985 | Angevine et al. | 423/DIG. 27 |
| 5,110,570 | 5/1992 | Bellussi et al. | 423/DIG. 27 |
| 5,296,208 | 3/1994 | Lesch | 423/700 |

FOREIGN PATENT DOCUMENTS 1017115  11/1991  WIPO .

OTHER PUBLICATIONS

Bhat et al. "Synthesis of Zeolite Beta Using Silica Gel as a Source of SiO$_2$," *J. Chem. Tech. Biotechnol.* 1990 (no month) vol. 48 pp. 453–466.

Perez–Pariente et al. "Factors Affecting the Efficiency of Zeolite Beta . . . " *Zeolites* vol. 8 Jan. 1988 pp. 46–53.

Camblor et al "Influence of The Synthesis Conditions on the Crystallization of Zeolite Beta" *Zeolites* vol. 11 Nov./Dec. 1991 pp. 792–797.

*Primary Examiner*—Mark L. Bell
*Assistant Examiner*—David Sample
*Attorney, Agent, or Firm*—Beverly J. Artale

[57] ABSTRACT

A synthetic zeolite, designated zeolite GZS-11, is made having a molar composition expressed by the formula:

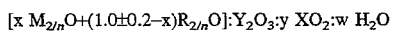

$$[x\, M_{2/n}O + (1.0 \pm 0.2 - x) R_{2/n}O] : Y_2O_3 : y\, XO_2 : w\, H_2O$$

where M is an inorganic cation of valance n, R is an organic cation of valence n, "x" has a value of less than 1.0, Y is one or more of +3 valence elements, such as aluminum, boron, gallium, iron, chromium, vanadium, molybdenum, or manganese, X is one or more of +4 valence elements, such as silicon, germanium, or titanium, "y" has a value of between 6 to 25, "w" has a value of up to 4 depending upon the degree of hydration of the zeolite, and having an X-ray diffraction pattern of the as-synthesized zeolite substantially as in Table 1. The method for making the low ratio of XO$_2$/Y$_2$O$_3$ such as SiO$_2$/Al$_2$O$_3$ is achieved by adjusting the synthesis mixture composition during the aging stage through the addition of one or more of the solutions containing the reactive sources of zeolitic components.

2 Claims, No Drawings

ZEOLITE GZS-11 AND ITS DYNAMIC PREPARATION PROCESS

This is a division of application Ser. No. 08/093,249, filed Jul. 16, 1993 now U.S. Pat. No. 5,389,358.

BACKGROUND OF THE INVENTION

1. Field of the Invention

The present invention relates to a zeolite, hereinafter referred to as zeolite GZS-11, to a dynamic synthetic method of making it, and to processes using it as a catalyst.

2. Discussion of the Prior Art

The synthesis of molecular sieves involves a variety of parameters, including gel composition, reaction temperature and pressure, reaction time, and the state of the synthesis gel (static or stirring, and stirring rate). Among these parameters, gel composition is probably the most significant, which contains important variables such as silicon/aluminum ratio, hydroxide concentration, inorganic and/or organic cation, and which determines in large part the structure and composition of the molecular sieve product. In the conventional synthesis of molecular sieves, the gel composition is defined at the very early stage when a synthesis gel is prepared. There has not been an intentional alteration of the gel composition during the aging of a synthesis gel until the formation of a molecular sieve is completed.

Post-treatment has been used to modify the composition of molecular sieves. U.S. Pat. No. 4,503,023 describes a process of extracting aluminum from $AlO_4$-tetrahedra of as-synthesized zeolite and substituting with silicon to form zeolite compositions having higher $SiO_2/Al_2O_3$ molar ratios. For example, zeolite Y has been treated by reacting with a solution containing $(NH_4)_2SiF_6$ to form LZ-210.

In contrast to these prior art techniques, the present invention uses a gel composition which has its composition changed during the aging step to effectively alter the composition of the final product. By using this process unique forms of zeolite beta are made.

Zeolite beta and its hydrothermal synthesis were first disclosed in U.S. Pat. 3,308,069, issued Mar. 7, 1967, to R. L. Wadlinger et al. As disclosed therein, zeolite beta has a chemical composition in its as-synthesized form expressed in terms of molar oxide ratios of

[xNa$_2$O+(1.0±0.1−x)TEA$_2$O]:Al$_2$O$_3$:ySiO$_2$:wH$_2$O where "x" has a value of less than 1.0, "y" has a value of greater than 10 but less than 200, "w" has a value of up to 4 depending upon the degree of hydration of the zeolite, and TEA represents tetraethylammonium ion. The zeolite is said to be formed by crystallization at temperatures in the range of 75° C. to 200° C., from an aqueous reaction mixture containing tetraethylammonium hydroxide and reactive sources of Na$_2$O, Al$_2$O$_3$, and SiO$_2$, with a composition of the reaction mixture, expressed in terms of mol ratios of oxides, within the following ranges:

| | |
|---|---|
| SiO$_2$/Al$_2$O$_3$ | 10 to 200 |
| Na$_2$O/TEAOH | 0 to 0.1 |
| TEAOH/SiO$_2$ | 0.1 to 1.0 |
| H$_2$O/TEAOH | 20 to 75 |

The more significant interplanar d-spacing of zeolite beta, dried in air at 110° C., are listed in Table A, below:

TABLE A

| Interplanar d-Spacing (Å) | Relative Intensity (I/I$_o$) |
|---|---|
| 11.5 ± 0.4 | M-S |
| 7.4 ± 0.2 | W |
| 6.6 ± 0.15 | W |
| 4.15 ± 0.10 | W |
| 3.97 ± 0.10 | VS |
| 3.00 ± 0.07 | W |
| 2.05 ± 0.05 | W |

The lowest silica/alumina ratio of 13.9 for zeolite beta is described in Example 1 of U.S. Pat. No. 3,308,069. Zeolite beta having silica/alumina ratio of 13.9 was prepared from a reaction gel mixture held at 78° C. for 42 days.

European Pat. Appl. No. 55,046 describes the synthesis of zeolite Nu-2, a member of the zeolite-beta family of zeolites, from reaction mixtures containing tetraethylammonium ion as the structural directing agent. Zeolite Nu-2 can only be prepared in pure form with products having SiO$_2$/Al$_2$O$_3$ ratios from 20 to about 50.

In a later synthesis of zeolite beta, disclosed in U.S. Pat. No. 4,554,145, the organic directing agent employed is derived from dibenzyl-1,4-diazabicyclo[2,2,2] octane chloride. The synthesis involves the preparation of a reaction mixture containing sources of alkali metal oxide, an oxide of alumina, an oxide of silica, water, and the cation of the aforementioned organic compound in proportions within the following ranges:

| | |
|---|---|
| SiO$_2$/Al$_2$O$_3$ | 5 to 250 |
| H$_2$O/SiO$_2$ | 10 to 100 |
| OH/SiO$_2$ | 0.09 to 0.8 |
| R/(R + M) | 0.1 to 0.8 | where R represents the organic cation and M represents the alkali metal cation. The quantity of OH− ion is calculated using only the contribution of inorganic alkali. In the two specific examples disclosed, crystallization of the zeolite beta is accomplished at 99° and 100° C. over periods of 119 and 169 days, respectively. Zeolite P and mordenite types of crystalline impurities are found in the products along with zeolite beta.

In U.S. Pat. No. 4,642,226 the synthesis of zeolite beta using dibenzyldimethylammonium ion as the directing agent is disclosed. The organic cations are derived from dibenzyldimethylammonium chloride added to the reaction mixture per se or produced therein in situ by the reaction of benzyl chloride with dimethylbenzylamine. It is stated that the composition of the reaction mixture is critical with respect to the presence of alkali-derived OH− groups and the SiO$_2$/Al$_2$O$_3$ molar ratio.

U.S. Pat. No. 4,923,690 discloses a synthesis process of zeolite beta which uses a mixture of tetraethylammonium halide and tetraethylammonium hydroxide as the directing agent. Either the hydroxide or the halide salt used alone is also reported to yield a zeolite beta-containing product which is 30% to 90% crystalline of which zeolite beta can constitute essentially all or some minor portion thereof.

U.S. Pat. No. 5,139,759 discloses a hydrothermal synthesis of zeolite beta from an aqueous reaction mixture containing the conventional reactive sources of SiO$_2$, Al$_2$O$_3$ and Na$_2$O, and tetraethylammonium halide as the source of the crystallization directing agent and diethanolamine as the agent providing the increased basicity necessary for formation of zeolite beta crystals. Seed crystals of zeolite beta are optionally employed to shorten the crystallization period. The $SiO_2/Al_2O_3$ ratio of the synthesized zeolite beta is claimed in the range of 10 to 200, and the ratios of 23.6 and 22.8 are obtained in the two examples.

U.S. Pat. No. 5,164,169 and 5,164,170 describe the synthesis of beta zeolite with triethanolamine and directing agents such as tetraethylammonium hydroxide, tetraethylammonium bromide, and tetraethylammonium fluoride. The $SiO_2/Al_2O_3$ ratio of the zeolite beta ranges from 20 to 200.

U.S. Pat. No. 5,171,556 reveals a beta type zeolite prepared in a fluoride medium and the zeolite contains fluorine whose content ranges from 0.005 to 2.0% by weight.

Perez-Pariente et al studied the factors affecting the synthesis of zeolite beta from aluminosilicate gels containing alkali and tetraethylammonium ions (Zeolites, 8(1988), 46). The $SiO_2/Al_2O_3$ ratio of the synthesis gel is varied from 30 to 900, resulting in the $SiO_2/Al_2O_3$ ratio of the zeolite in the range of 22 to 86. As the crystallization proceeds, the $SiO_2/Al_2O_3$ ratio of the liquid phase increases and the final ratio can be as high as 30,000.

Camblor et al discussed the effect of sodium and potassium in the synthesis of zeolite beta (Zeolites, 11(1991), 202). They found that the lowest $SiO_2/Al_2O_3$ ratios for zeolite beta are near 13 in all cases. At the end of the crystallization, the solution phase of the reaction mixture has a $SiO_2/Al_2O_3$ ratio as high as >10,000.

Caullet et al reported (Zeolites, 12(1992), 240) the synthesis of zeolite beta from nonalkaline fluoride aqueous aluminosilicate gels containing diaza-1,4-bicyclo [2.2.2] octane (DABCO) and methylamine as the templates. Zeolite beta is obtained from the gel mixtures having the following gel compositions:

$$5-60 SiO_2 : 1 Al_2O_3 : 1 DABCO : 1 CH_3NH_2 : 2 HF : 10 H_2O$$

held at a temperature of between 150° and 200° C. for 7 to 21 days. Full transformation of the gel into zeolite beta requires the presence of seed crystals of preformed zeolite beta. The $SiO_2/Al_2O_3$ ratio of zeolite beta produced ranges from ca. 18 to 44.

Other synthesis of zeolite beta using tetraethylammonium ion as the template can be found in the following publications: Appl. Catal. 31(1987), 35; Appl. Catal. 69(1991), 49; Zeolites 11(1991), 792; Zeolites 12(1992), 280; J. Chem. Tech. Biotechnol. 48(1990), 453.

Boron beta zeolite has been made using a diquaternary ion as a template. U.S. Pat. No. 5,166,111 discloses a synthesis of low-aluminum boron beta zeolite in which aluminum content is less than 0.1% by weight and the ratio of $YO_2/W_2O_3$ is greater than 10, where Y is selected from silicon, germanium, and mixtures thereof, W is boron or mixtures of boron with aluminum, gallium, or iron.

Gallium beta zeolite has been reported in the literature. Liu et al. described the galliation of zeolite beta to form gallium beta (Zeolites, 12(1992), 936). Hegde et al. reported the direct synthesis of gallium beta zeolite and studied it by FT i.r spectroscopy (Zeolites, 12(1992), 951).

The framework structure of zeolite beta has been thoroughly investigated by Newsam et al. using primarily high-resolution electron microscopy, electron diffraction, computer-assisted modelling and powder X-ray diffraction (Proc. B. Soc. Lond. A 420, 375 (1988)). Zeolite beta can be regarded as a highly intergrown hybrid of two distinct, but closely related structures that both have fully three-dimensional pore systems with 12-rings as the minimum constricting apertures. Other groups have studied the structure of beta zeolite as well and obtained similar conclusions.

See publications: J. Chem. Soc. Chem. Comm. 1990, 813; Zeolites, 8(1988), 446.

Zeolite beta is useful as a catalyst and/or as an adsorbent. U.S. Pat. No. 4,898,846 describes the use of zeolite beta as an component for catalytic cracking catalysts. The as-synthesized zeolite beta is exchanged with ammonium and is calcined at temperatures high enough to decompose ammonium to proton. The H-form of zeolite beta is mixed with other components to form cracking catalysts which exhibit advantageous properties for converting petroleum into gasoline.

U.S. Pat. No. 4,740,292 describes the use of zeolite beta as a cracking component in the conversion of heavy oil to light products. This leads to higher octane gasoline, increased yields of propylene and butene, and a low pour point distillate product.

U.S. Pat. No. 5,160,033 describes a catalyst composition for a hydrocracking process. The catalyst is a combination of a steam-stabilized form of zeolite Y and a form of zeolite beta which has been modified to maximize the weak acid sites and minimize the strong acid sites.

While prior art has described the synthesis of zeolite beta, the claimed low limit of $SiO_2/Al_2O_3$ ratio of this zeolite is above 10. In practice the lowest $SiO_2/Al_2O_3$ ratio ever achieved for zeolite beta using the conventional synthetic process is around 14. A beta-like zeolite with a low $SiO_2/Al_2O_3$ ratio of, for example, 10 may possess some advantages over the regular zeolite beta as a catalyst and/or an adsorbent.

It is therefore an object of this invention to disclose a new zeolite, GZS-11, which has a $SiO_2/Al_2O_3$ ratio between 6 to 25 and which possesses a structure similar to that of zeolite beta.

It is a further object of this invention to teach a novel procedure for zeolite synthesis. By using this procedure, the composition of zeolites can be altered conveniently.

It is a further object of this invention to use the zeolite prepared in the instant invention as a component of catalysts and adsorbents.

These and further objects of the present invention will become readily apparent to one skilled in the art as the description of the invention proceeds.

SUMMARY OF THE INVENTION

According to the present invention we provide a synthetic zeolite, designated zeolite GZS-11, having a molar composition expressed by the formula:

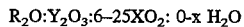

$$R_2O : Y_2O_3 : 6-25 XO_2 : 0-x\ H_2O$$

where R is a monovalent cation or 1/n of a cation of valence n, Y is one or more of +3 valence elements, such as aluminum, boron, gallium, iron, chromium, vanadium, molybdenum, and manganese, and X is one or more of +4 valence elements, such as silicon, germanium, and titanium, and having X-ray pattern of the as-synthesized zeolite substantially set out in Table 1.

The X-ray diffraction pattern of GZS-11 is very similar to that of zeolite beta, and we believe that GZS-11 is a member of the zeolite beta family. However, the composition range of GZS-11 is significantly different from that of zeolite beta. In particular, when Y is aluminum and X is silicon in the above formula, the silica/alumina ratio of zeolite GZS-11 is much lower than ever achieved for zeolite beta. Generally, zeolite beta crystallizes with silica/alumina ratio between 20 and 35. The lowest $SiO_2/Al_2O_3$ ratio for zeolite beta ever obtained is about 14 as set forth in U.S. Pat. No. 3,308,069.

Attempts to decrease the silica/alumina ratio of zeolite beta have not been successful in the past due to formation of other phases. On the contrary, a $SiO_2/Al_2O_3$ ratio below 10 can easily be obtained for zeolite GZS-11 via the use of the instant invention.

The ability to achieve such a low silica/alumina ratio in GZS-11 is due to a novel dynamic synthetic process. This novel process involves initial nucleation of a crystalline zeolite, immediately followed by addition of one or more reagents to the synthesis gel. With a suitable reagent, the concentration of both $Y_2O_3$ and $XO_2$ can be varied independently. The dynamic change of gel composition affects the composition of the final zeolitic products.

The novel feature of this invention is the unique new process step of altering the composition of the synthesis gel to a chosen range. This alteration of the synthesis gel composition results in a zeolite with desirable compositions, such as a unique $SiO_2/Al_2O_3$ ratio. The control of gel compositions is achieved by addition of one or more solutions which contain one or more of the reactant ions, during the synthesis of a zeolite. The solutions to be added to the zeolite synthesis mixture during crystallization are controlled so that the desired compositions, including silica/alumina ratio, hydroxide/alumina ratio, can be obtained.

Using this process, a new composition of matter, designated as GZS-11, has been synthesized. In a preferred embodiment GZS-11 contains silica, alumina, sodium, and tetraethylammonium cation. The $SiO_2/Al_2O_3$ ratio of this preferred embodiment GZS-11 is between 6 to 25. It has a large surface area and pore volume, and has an XRD pattern similar to that of zeolite beta.

Zeolite GZS-11 is active for hydrocarbon cracking. GZS-11 can be ammonium-exchanged then calcined to give the hydrogen form, H-GZS-11. It can be exchanged with rare earth to form RE-GZS-11. Both H-GZS-11 and RE-GZS-11 are active as cracking catalysts for hydrocarbon conversion, and are useful in FCC, hydrocracking, and other types of hydrocarbon conversion. FCC catalysts made from GZS-11 zeolite have favorable selectivity toward gasoline, coke, and low molecular weight isoolefins, including isobutylene.

DESCRIPTION OF THE PREFERRED EMBODIMENTS

The conventional method of zeolite synthesis involves a gel preparation using inorganic sources and sometimes organic directing agents, followed by heating the gel mixture to one or more preset temperatures and aging at each temperature for a certain time, with or without stirring, until the final zeolite product is formed. Typically, once the initial gel mixture is made and the aging process begins, the composition of the reaction mixture is not changed during the aging period.

Although successful in most cases, this method has its limitations. In order to make a particular zeolite, the composition of a starting gel mixture has to be within a certain range. Nucleation and initial crystallization of a desired zeolite predetermines the composition range of a gel mixture. Outside this range will give other product(s) or amorphous phases. In turn, this predetermined composition range of gel mixture will limit the composition range of the final zeolite product.

To partially remove the limitations discussed above, the instant invention teaches a new method of making zeolites, the "dynamic synthetic method". The dynamic synthetic method allows the nucleation and initial crystallization of a zeolite at one particular gel composition and crystal growth at another gel composition. The new method consists of the following basic steps:

(1) Prepare a synthesis gel mixture by mixing sources of inorganic reactants and organic structural directing agents. Reactive sources of aluminum, silicon and alkali metal include aluminates, aluminas, silicates, silica hydrosols, reactive amorphous solid silicas, silica gel, tetraalkylorthosilicates, silicic acid and alkali metal hydroxides. Organic structural directing agents include tetraalkylammonium ions, trialkylammonium ions, dialkylammonium ions, monoalkylammonium ions, amines with same or different alkyl groups, tetraalkylphosphonium ions, to list a few. The initial gel composition is determined to favor the nucleation of the desired zeolite.

(2) Heat the gel mixture, with or without stirring, to a desired temperature and age at that temperature for a specified length of time until nucleation and initial crystallization begin. The nucleation and initial crystallization can be monitored by any suitable analytical technique, such as MAS NMR, XRD and IR.

(3) Once crystallization has begun, add one or more solutions which contain one or more reactants into the reaction mixture over a predetermined length of time. These solutions can be prepared using inorganic and organic reagents, and may include structural directing agents. During this stage, the composition of the liquid phase of the reaction mixture is slowly changed while the crystals of the desired zeolite are growing. Care needs to be taken to control the rate of solution addition so that the crystallization process is not interrupted by a sudden change of the composition of the liquid phase. The total amount of each solution to be added may also be limited for a specific zeolite. Beyond this limit other impurity phases may form.

(4) Continue aging the mixture, with or without stirring, at a specified temperature for a specified length of time. This step allows the completion of crystallization of a zeolite.

(5) Stop aging after the zeolite formation is completed, and collect the crystalline product by filtration or centrifugation, washing, and drying.

This general method can be modified to fit different needs. For example, a preformed zeolite seed may be added before or during the aging of a gel mixture. Steps (3) and (4) may be repeated if necessary to further tune the gel composition.

In step (3), solutions containing different elements from step (1) can be used to incorporate different elements into the framework of the zeolite structure. For example, the gel mixture in step (1) may only contain silicon and aluminum as the zeolite constituents for initial crystallization, but iron or boron may be added in step (3) to make zeolites which contain iron or boron in the framework. The addition in step (3) is not limited to liquid, and another gel or even solid can be added, provided that their delivery rates are well controlled.

Using this novel dynamic synthetic method, the compositions of a number of zeolites, such as beta, ZSM-5, and ZSM-11, to name a few, can be extended to a wider range than they were achieved previous using conventional hydrothermal synthesis methods. The dynamic synthetic method should not be limited to the synthesis of zeolite, and it can be applied to any synthesis of inorganic materials where the composition of a final product can not be obtained by using the conventional method.

A new zeolite, designated as GZS-11, was synthesized using this dynamic synthetic method. The synthesis of GZS-11 consists the following several steps, which also serves as an example to illustrate the dynamic synthesis process.

(1) Prepare an initial gel mixture which contains sources of, for example, alkali or alkaline earth metal (M), e.g.

sodium or potassium, cation if desired, one or a combination of oxides selected from the group consisting of trivalent element X, e.g. aluminum, tetravalent element Y, e.g. silicon, one or more organic (R) directing agents, e.g. tetraethylammonium hydroxide and/or halides, and a solvent or solvent mixture, e.g. water, said gel mixture having a composition, in terms of mole ratios, within the following ranges:

$XO_2/Y_2O_3 = 18-100$ $M_2O/Y_2O_3 = 0.5-5$ $(R_2+M_2O)/Y_2O_3 = 1-15$ $H_2O/(Y_2O_3+XO_2+M_2O+R_2) = 1-50$ and a pH value in the liquid phase of the mixture between 9–14. Preformed zeolite beta seeds may be added to shorten the nucleation time in step (2).

(2) Age the gel mixture at a temperature between 50° C. and 200° C. under atmospheric or autogenous pressure for from 2 hours to 10 days, with or without stirring.

(3) Add to the reaction mixture one or more solutions which may contain monovalent element, e.g. sodium, trivalent element, e.g. aluminum, and/or tetravalent element, e.g. silicon, and/or organic directing agent, e.g. tetraethylammonium hydroxide or halide. The addition solutions and the rates of additions should be carefully selected so that the overall concentration of OH does not change dramatically from the pH of the initial gel mixture.

(4) After the completion of the addition, continue to age the mixture at a temperature between 50° and 200° C. for between 0.1 to 10 days.

(5) Cool down the reaction mixture to room temperature and collect GZS-11 crystals by centrifuging or filtering the solid, washing with water and drying at 100° C.

Zeolite GZS-11 obtained from the dynamic synthetic method exhibits an XRD pattern as listed in Table 1. Its XRD pattern is similar to that of Beta zeolite.

Zeolite GZS-11 prepared by the process of this invention may be used as a sorbent or as a catalyst, e.g., in a hydrocarbon conversion process such as in cracking or reforming operations, isomerization, aromatization, or alkylation and in the hydrocracking of lube stocks and fuels. In order to use zeolite GZS-11 as an adsorbent and/or as a catalyst, it is necessary to remove the organic template which fills the channels of the zeolite. This can be achieved by calcining the zeolite GZS-11 at a temperature between 500° and 600° C. for a sufficient amount of time to decompose the organics into carbon dioxide and water. The calcined GZS-11 has a large BET surface area in the range of 500 to 700 m²/g, and a pore volume, which is consistent with its three-dimensional and large-pore structure.

It may be desired to exchange part or all of the sodium cations in the zeolite structure with other cations or to use the acid form of the zeolite containing hydrogen as the cation. The acid form of GZS-11 zeolite may be obtained by first exchanging the zeolite with ammonium cation, followed by calcining the exchanged zeolite at temperature of between 500° and 600° C. for a sufficient amount of time to decompose the organic template to carbon dioxide and water and to remove ammonium, thus forming the hydrogen form of GZS-11. Other cations than hydrogen or ammonium can be other metals of Groups I through VIII of the Periodic Table.

In order to effectively exchange other inorganic cations, such as rare earth metals, into the zeolite GZS-11 structure, the zeolite should be calcined first, using the procedure described above, to remove the template and make the channels accessible to other cations. Cations such as rare earth can be exchanged into the zeolite structure by stirring the zeolite with a solution containing the desired cations, or by impregnation, followed by calcination.

Both H-GZS-11 and RE-GZS-11 can be steamed at temperatures of up to 760° C. to 816° C. for from 1 to 4 hours for deactivation. The steamed zeolites show good crystallinity by X-ray powder diffraction. The steamed zeolites have high cracking activity for hydrocarbon conversion in microactivity tests. They show favorable selectivity toward gasoline, coke, light cycle oil, and low molecular weight isoolefins, including isobutylene.

The process described herein represents a novel method of preparing zeolites with altered zeolitic compositions. Having described the basic aspects of our invention, the following examples are given to illustrate specific embodiments thereof. These examples are to be considered illustrative only, and are not to be construed as limiting the scope of this invention.

EXAMPLE 1

A synthesis mixture was prepared by mixing 31.43 g of sodium aluminate solution ($Al_2O_3$:21.40 wt %; $Na_2O$: 18.20 wt %), 132.16 g of precipitated silica (90 wt % $SiO_2$), 111.75 g of tetraethylammonium hydroxide (TEAOH: 35 wt %), 55.77 g of tetraethylammonium bromide, 304 g of deionized water, and 5 g of zeolite Beta (3.2 wt % based on total $SiO_2$), to give a gel composition in terms of the molar ratio as follows:

4.0(TEAOH):4.0(TEABr):1.4$Na_2O$:$Al_2O_3$:30.0$SiO_2$:333$H_2O$

This gel was heated while stirring to reflux temperature under atmospheric pressure and was kept refluxing for 80 hours. A solution prepared by dissolving 9.1 g of aluminum chips in 421.9 g of TEAOH (35 wt %) was added to the reaction mixture over 30 hours. Another 800 ml solution containing 1 M HCl was added simultaneously. The reaction mixture, having the following overall composition:

5.4(TEAOH):1.1(TEABr):0.4$Na_2O$: $Al_2O_3$:8.7$SiO_2$:159$H_2O$ was stirred for another 40 hours. The zeolitic product was collected by filtration, washed three times with deionized water, and dried at 100° C.

The isolated zeolite GZS-11 exhibits an XRD pattern as listed in Table 1.

TABLE 1

| XRD Pattern of GZS-11 | | |
|---|---|---|
| 2θ Angle ° | d spacing, Å | Rel. Intensity |
| 7.75 | 11.4 | 13.5 |
| 11.70 | 7.56 | 2.0 |
| 14.65 | 6.04 | 1.4 |
| 16.43 | 5.39 | 4.0 |
| 18.14 | 4.89 | 2.4 |
| 20.99 | 4.23 | 8.6 |
| 21.37 | 4.15 | 17.9 |
| 22.44 | 3.96 | 100.0 |
| 25.28 | 3.52 | 8.5 |
| 26.81 | 3.32 | 15.1 |
| 28.74 | 3.10 | 6.7 |
| 29.45 | 3.03 | 19.5 |
| 30.45 | 2.93 | 7.4 |
| 33.35 | 2.68 | 5.4 |
| 34.56 | 2.59 | 1.1 |
| 36.07 | 2.49 | 2.0 |
| 38.29 | 2.35 | 1.4 |
| 39.96 | 2.25 | 1.6 |
| 43.55 | 2.08 | 11.1 |

TABLE 1-continued

XRD Pattern of GZS-11

| 2θ Angle ° | d spacing, Å | Rel. Intensity |
| --- | --- | --- |
| 48.15 | 1.89 | 1.4 |
| 49.47 | 1.84 | 2.7 |
| 52.33 | 1.75 | 3.5 |
| 55.30 | 1.66 | 4.0 |
| 56.33 | 1.63 | 2.8 |
| 59.96 | 1.54 | 0.7 |

$^{27}$Al Magic Angel Spinning (MAS) NMR of the product GZS-11 reveals only the tetrahedral aluminum. The product GZS-11 was calcined at 550° C. for 2 hours and the calcined GZS-11 had a SiO$_2$/Al$_2$O$_3$ ratio of 9.2.

EXAMPLE 2

An initial reaction mixture was prepared according to Example 1 above. The mixture was heated while stirring to refluxing temperature under atmospheric pressure and was kept refluxing for 89 hours. A solution, prepared by dissolving 7.35 grams of aluminum chips in 344 grams of TEAOH (35 wt %), was slowly added into the refluxing mixture over a period of two days. During this period, a total of 75 grams of HCl (12 N) was added slowly. After the completion of additions, reflux was continued for another six days. The product was filtered, washed three times with deionized water, and dried at 100° C. The product was characterized by XRD as GZS-11, and ICP analysis gave a SiO$_2$/Al$_2$O$_3$ ratio of 12.8.

EXAMPLE 3

An initial reaction mixture was prepared according to Example 1 above. The mixture was heated while stirring to refluxing temperature under atmospheric pressure and was kept refluxing for 4.5 days. A solution, prepared by dissolving 3.2 grams of aluminum chips in 148.8 grams of TEAOH (35 wt %), was slowly added into the refluxing mixture over a period of 5 days. An aqueous solution (97.4 grams) containing 22.8 wt % AlCl$_3$ was added simultaneously during that period of time. After the completion of additions, the mixture, having the following composition:

3.0(TEAOH):1.3(TEABr):0.4Na$_2$O:Al$_2$O$_3$:9.7SiO$_2$:151H$_2$O:2.4HCl was allowed to reflux with stirring for another 7 days.

The zeolite product was filtered, washed three times with water, and dried at 100° C. XRD of the powder showed it to be GZS-11, and ICP analysis of the isolated zeolite GZS-11 gave the following molar composition in terms of oxide ratio, as determined by ICP:

0.61(TEA)$_2$O:0.36Na$_2$O:Al$_2$O$_3$:9.29SiO$_2$

The GZS-11 was calcined at 550° C for two hours under a flow of air. The calcined GZS-11 gave a BET surface area of 575 m$^2$/g.

EXAMPLE 4

A synthesis mixture was prepared by mixing 50.00 g of sodium aluminate solution (Al$_2$O$_3$:21.40 wt %; Na$_2$O: 18.20 wt %), 210.20 g of precipitated silica (90 wt % SiO$_2$), 317.00 g of tetraethylammonium hydroxide (TEAOH: 20 wt %), 91.8 g of tetraethylammonium bromide, 350.00 g of deionized water, and 10.00 g of zeolite Beta (3.9 wt % based on total SiO$_2$), to give a gel composition in terms of the molar ratio as follows:

4.0(TEAOH):4.0(TEABr):1.3Na$_2$O:Al$_2$O$_3$:30.0SiO$_2$:333H$_2$O

This gel was heated while stirring to reflux temperature under atmospheric pressure and was kept refluxing for 86 hours. An aqueous solution containing 2.28 wt % Al$_2$O$_3$ and 19.76 wt % TEAOH and prepared by dissolving aluminum chips in 20 wt % tetraethylammonium hydroxide, was added to the reaction mixture. Another aqueous solution containing 13.80 wt % AlCl$_3$ and 25 wt % TEABr was added into the solution simultaneously. Additions were continued for 29 hours until a total of 540 grams of Al/ TEAOH solution and 235 grams of AlCl$_3$/ TEABr solution were added. The reaction mixture, having the following overall composition:

3.3(TEAOH):2.0(TEABr):0.4Na$_2$O:Al$_2$O$_3$:9.4SiO$_2$:192H$_2$O:2.1HCl was stirred for another 65 hours. The zeolitic product was collected by filtration, washed three times with deionized water, and dried at 100° C. The isolated product gave an X-ray powder diffraction pattern identical to that of zeolite GZS-11 and ICP analysis gave a SiO$_2$/Al$_2$O$_3$ ratio of 9.4.

EXAMPLE 5

A synthesis mixture was prepared by mixing 2.50 kg of sodium aluminate solution (Al$_2$O$_3$:21.40 wt %; Na$_2$O: 18.20 wt %), 10.51 kg of precipitated silica (90 wt % SiO$_2$), 15.85 kg of tetraethylammonium hydroxide (20 wt %), 3.61 kg of tetraethylammonium chloride (99 wt %), and 17.50 liters of deionized water, to give a gel composition in terms of the molar ratio as follows:

4.0(TEAOH):4.0(TEACl):1.3Na$_2$O:Al$_2$O$_3$:30.0SiO$_2$:333H$_2$O

This gel was heated by steam to reflux temperature under atmospheric pressure while stirring vigorously. After 27 hours, 0.50 kg of preformed crystalline zeolite Beta (3.9 wt % based on total SiO$_2$) was added to the reactor and the mixture was kept refluxing for another 84 hours. An aqueous solution containing 2.07 wt % Al$_2$O$_3$ and 19.76 wt % TEAOH was added to the reaction mixture. Another aqueous solution containing 13.80 wt % AlCl$_3$ and 25 wt % TEACl was added into the solution simultaneously. Additions were continued for 27 hours until a total of 23.28 kg of Al/ TEAOH solution and 11.75 kg of AlCl$_3$/ TEACl solution were added. The reaction mixture, having the following overall composition:

3.3(TEAOH):2.4(TEACl):0.5Na$_2$O:Al$_2$O$_3$:10.1SiO$_2$:198H$_2$O:2.2HCl was stirred for another 24 hours. The zeolitic product was collected by filtration, washed three times with deionized water, and dried at 100° C. The isolated GZS-11 zeolite gave an X-ray powder diffraction pattern identical to that of Table 1, and a SiO$_2$/Al$_2$O$_3$ of 10.24. This zeolite GZS-11 was calcined in the air for 2 hours at 550° C. and the-calcined GZS-11 had a BET surface area of 547 m$^2$/g.

Comparative Example

This Comparative Example demonstrates that a zeolite Beta with silica-to-alumina ratio close to that of the starting synthesis gel was obtained when no solutions of reactants were added during crystallization.

A synthesis mixture was prepared by mixing 31.43 g of sodium aluminate solution (Al$_2$O$_3$:21.40 wt %; Na$_2$O: 18.20 wt %), 132.16 g of precipitated silica (90 wt % SiO$_2$), 1.75 g of tetraethylammonium hydroxide (TEAOH: 35 wt %), 61.00 g of tetraethylammonium bromide, 303.5 g of deionized water, and 6 g of zeolite Beta (3.9 wt % based on total SiO$_2$), to give a gel composition in terms of the molar ratio as follows:

3.9(TEAOH):4.3(TEABr):1.4Na$_2$O:Al$_2$O$_3$:30.0SiO$_2$:331H$_2$O

This gel was heated while stirring to reflux temperature under atmospheric pressure and was kept refluxing for 6 days. The zeolite product was collected by filtration, washed three times with deionized water, and dried at 100° C. The product was characterized by XRD as zeolite Beta, and ICP analysis gave a SiO$_2$/Al$_2$O$_3$ ratio of 30.0.

EXAMPLE 6

Zeolite GZS-11 from Example 5 was exchanged with NH4 cation by stirring with a 10 wt % (NH$_4$)$_2$SO$_4$ solution (GZS-11: (NH$_4$)$_2$SO$_4$: H$_2$O=1:1:10) at 80° C. for 30 min. The mixture was filtered and the exchange was repeated one additional time. The exchanged zeolite was calcined at 550° C. for 2 hrs with air flow to form H-GZS-11. The calcined H-GZS-11 zeolite had similar XRD diffraction pattern as GZS-11. It had a SiO$_2$/Al$_2$O$_3$ ratio of 10.35 and a BET surface area of 553 m$^2$/g.

EXAMPLE 7

This example illustrates the usefulness of H-GZS-11 zeolite as a cracking catalyst for hydrocarbon conversion. For such purposes, the H-GZS-11 zeolite prepared in Example 6 was steamed at 760° C. for 4 hrs, and was tested using a microactivity test (MAT) which is a modification of the test procedure published by F. G. Ciapetta and D. S. Henderson entitled "Microactivity Test for Cracking Catalysts", Oil and Gas Journal, Vol. 65, pages 88–93, Oct. 16, 1967. Microactivity tests are routinely used in the petroleum industry to evaluate cracking catalysts in the laboratory. The petroleum fraction which was cracked over these catalysts was a sour import heavy gas oil (SIHGO), which has properties listed in Table 2. The test was run at 980° F. at catalyst/oil weight ratios between 1 to 3 and a WHSV between 41 and 121 hr$^{-1}$. Table 3 shows the test results.

TABLE 2

| SIHGO Feedstock Properties | |
|---|---|
| °API | 22.5 |
| Specific Gravity @ 60° F. | 0.9186 |
| Aniline Point, °F. | 163 |
| Sulfur, wt. % | 2.59 |
| Total Nitrogen, wt. % | 0.086 |
| Basic Nitrogen, wt. % | 0.034 |
| Conradson Carbon, wt. % | 0.25 |
| Ni, ppm | 0.8 |
| V, ppm | 0.06 |
| K Factor | 11.52 |

TABLE 3

| MAT Results of H-GZS-11 Zeolite | | | |
|---|---|---|---|
| Run No. | 1 | 2 | 3 |
| Cat/Oil Ratio | 0.99 | 1.92 | 2.91 |
| Conversion, wt % | 31.3 | 46.5 | 57.5 |
| Coke, wt % | 1.16 | 1.91 | 2.91 |
| Gasoline, wt % (C5–C12) | 18.79 | 25.68 | 28.30 |
| LCO, wt % (430F–650F) | 20.24 | 18.44 | 16.82 |
| HCO, wt % (above 650F) | 48.44 | 35.04 | 25.65 |
| C$_3$ (Paraffin + Olefin) | 3.67 | 6.30 | 8.99 |
| C$_4$ Paraffin | 1.16 | 3.26 | 5.32 |
| C$_4$ Olefin | 5.46 | 7.89 | 10.03 |
| isobutylene | 2.51 | 3.47 | 4.28 |
| C$_4$ Olefin/C$_4$ Total | 0.83 | 0.71 | 0.65 |
| isobutylene/C$_4$ Olefin | 0.46 | 0.44 | 0.43 |
| Research Octane | 91.9 | 93.4 | 94.4 |
| Motor Octane | 78.3 | 79.8 | 80.9 |

The results in Table 3 show that H-GZS-11 is active for vacuum oil cracking, and it has a high selectivity for olefins, in particular, for isobutylene.

It is understood that the foregoing detailed description is given merely by way of illustration and that many variations may be made therein without departing from the spirit of this invention.

What is claimed is:

1. A method of preparing a GZS-11 zeolite comprising the steps of:

(1) preparing a synthesis gel mixture of a first composition by mixing a reactive source containing a trivalent element, a reactive source containing a tetravalent element, one or more organic structure directing agents and a reactive source containing mono or divalent inorganic cations;

(2) heating the gel mixture and aging until nucleation and initial zeolite crystallization begin;

(3) altering the gel mixture by adding at least one reactant containing a trivalent element into the gel mixture after crystallization has begun;

(4) continuing the aging of the gel mixture to allow the completion of the crystallization of zeolite from the altered gel mixture; and (5) recovering the crystalline zeolite product.

2. A method according to claim 1, wherein a preformed zeolite seed is added together with the reactive sources in step (1).

* * * * *